United States Patent
Corby, Jr. et al.

(10) Patent No.: US 6,697,764 B2
(45) Date of Patent: Feb. 24, 2004

(54) REDUCED ACCESS FIELD INSPECTION SYSTEM AND APPARATUS

(75) Inventors: Nelson Raymond Corby, Jr., Scotia, NY (US); Kristina Helena Valborg Hedengren, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/681,217

(22) Filed: Feb. 27, 2001

(65) Prior Publication Data

US 2001/0034585 A1 Oct. 25, 2001

Related U.S. Application Data

(60) Provisional application No. 60/191,350, filed on Mar. 22, 2000.

(51) Int. Cl.[7] .......................... G21C 17/00; A61B 1/04
(52) U.S. Cl. .......................... 702/184; 702/113; 348/72
(58) Field of Search .............................. 702/33–36, 38, 702/57, 81–84, 108, 113–115, 121–123, 127, 183–185, 188; 356/241.1; 348/45, 65, 72; 700/259, 245, 264

(56) References Cited

U.S. PATENT DOCUMENTS

| | | | | |
|---|---|---|---|---|
| 3,279,460 A | * | 10/1966 | Sheldon | 600/115 |
| 4,340,302 A | * | 7/1982 | Oku | 356/241.1 |
| 4,640,124 A | * | 2/1987 | Diener et al. | 73/116 |
| 5,045,936 A | * | 9/1991 | Lobb et al. | 348/67 |
| 5,184,601 A | * | 2/1993 | Purman | 600/102 |
| 5,217,003 A | * | 6/1993 | Wilk | 600/109 |
| 5,738,676 A | * | 4/1998 | Hammer et al. | 606/4 |
| 5,808,665 A | * | 9/1998 | Green | 348/65 |
| 5,877,819 A | * | 3/1999 | Branson | 348/701 |
| 6,011,617 A | | 1/2000 | Naudet | 356/237.1 |
| 6,332,865 B1 | * | 12/2001 | Borody et al. | 600/114 |
| 6,432,046 B1 | * | 8/2002 | Yarush et al. | 600/179 |
| 6,542,230 B1 | * | 4/2003 | Luke | 356/241.1 |
| 2002/0042620 A1 | * | 4/2002 | Julian et al. | 606/130 |

FOREIGN PATENT DOCUMENTS

| | | | |
|---|---|---|---|
| DE | 3243302 | 11/1982 | |
| DE | 3729131 C1 | * 3/1989 | |
| GB | 2036363 A | * 6/1980 | G02B/22/00 |
| WO | 0050304 | 8/2000 | |

OTHER PUBLICATIONS

Richter, R. NASA, Stanford Program: Telesurgery may bridge future gaps. Jan. 24, 1988. Times Tribune, 94th year, pp. A–1 and A–16.*

Merriam–Webster's Collegiate Dictionary, 10th Edition, 1999, pp. 55,56.*

"Telesurgery May Bridge Future Gaps" by Ruth Richter, Times Tribune, Jan. 24, 1988, pp. 1–2.

* cited by examiner

Primary Examiner—Marc S. Hoff
Assistant Examiner—Manuel L Barbee
(74) Attorney, Agent, or Firm—Patrick K. Patnode; Christian G. Cabou

(57) ABSTRACT

A reduced access field inspection system includes a multimodality endoscopic assembly. Circuitry is coupled to the multimodality endoscopic assembly for generating signals associated with the multimodality endoscopic assembly. A communications link links the circuitry to a remote center of excellence for providing maintenance information.

16 Claims, 3 Drawing Sheets

REDUCED ACCESS FIELD INSPECTION SYSTEM AND APPARATUS

CROSS REFERENCE TO RELATED APPLICATIONS

This application claims priority of a Provisional Application, Ser. No. 60/191,350, filed on Mar. 22, 2000 and entitled "Reduced Access Inspection System," which Provisional Application is herein incorporated by reference.

FEDERAL RESEARCH STATEMENT

The U.S. Government may have certain rights in this invention pursuant to contract number F33615-97-D-5271 awarded by the Air Force Research Laboratory.

BACKGROUND OF INVENTION

The invention relates generally to inspection systems and more particularly to reduced access field inspection systems and apparatus.

Complex machines or assemblies often require high levels of maintenance or monitoring to ensure problem-free operation. Often the maintenance or monitoring requires machine downtime, typically creating un-wanted consequences.

One example of a complex machine is an aircraft. Current aircraft inspection methods, whether on-wing (on the flight line) or off-wing (in a service area) are time-consuming and costly, removing aircraft and engines from service for extended time periods. Aircraft are routinely inspected to ensure safe operation. Many portions of an aircraft are inaccessible and direct visual inspection is difficult or impossible.

Accordingly, there is a need in the art for a rapid reliable inspection system to reduce cost and equipment downtime while providing accurate results.

SUMMARY OF INVENTION

A reduced access field inspection system includes a multimodality endoscopic assembly. Circuitry is coupled to the multimodality endoscopic assembly for generating signals associated with the multimodality endoscopic assembly. A communications link links the circuitry to a remote center of excellence for providing maintenance information.

BRIEF DESCRIPTION OF DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which.

DETAILED DESCRIPTION

Figure 1:
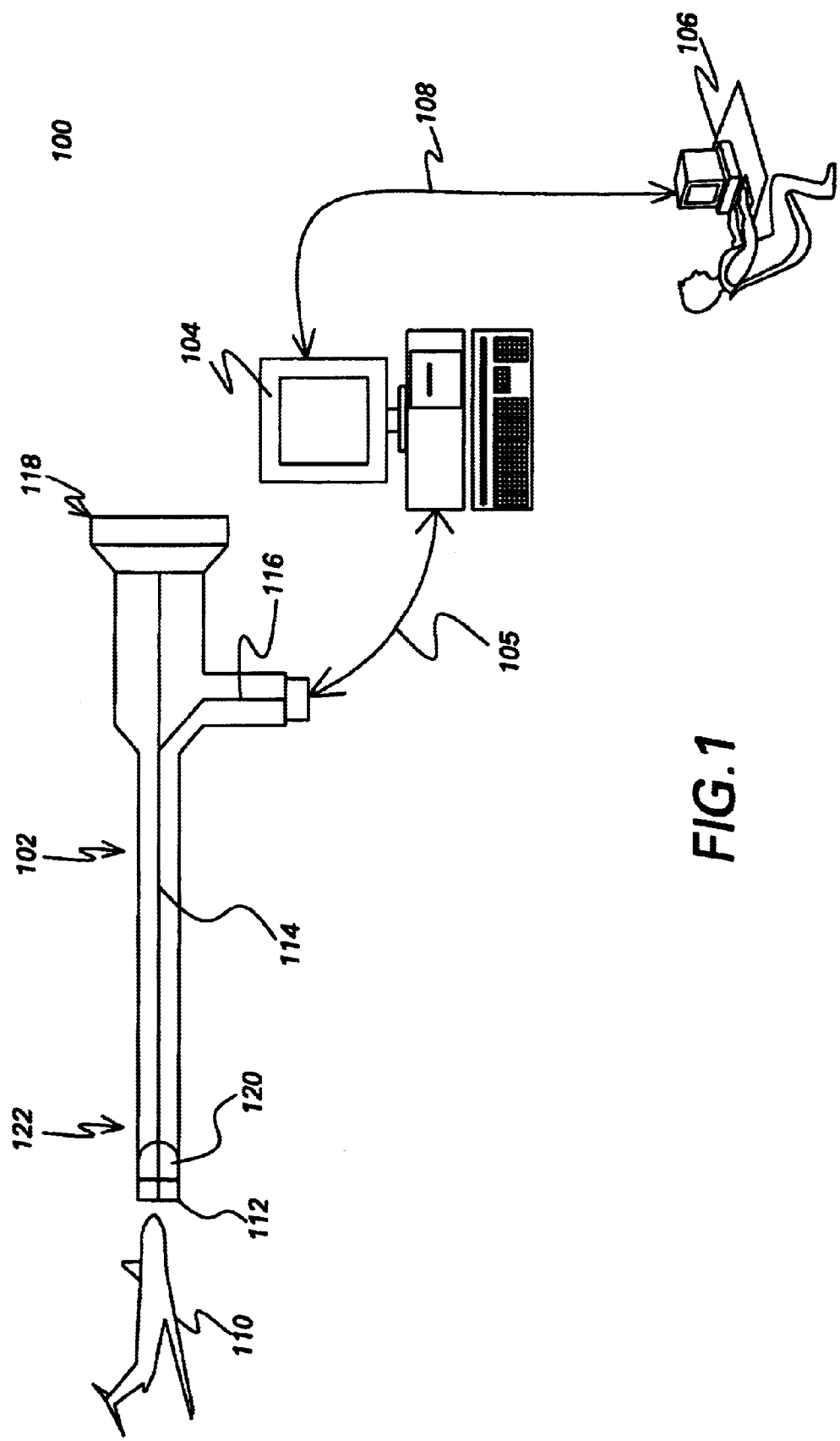
FIG. 1 is a schematic depiction of one aspect of the instant invention.

As used herein the term "communication link" means the transmission of data from one computer to another or from one device to another. A communications device, therefore, is any machine that assists data transmission. For example, modems, cables, and ports are all communications devices. Communication software refers to programs that make it possible to transmit data. Communication link can be over a landline or cable or may be a wireless connection. Examples of wireless technologies include Cellular (Analog, CDPD), Digital PCS (GSM, TDMA, CDMA, Nextel), Terrestrial Packet Data Networks (Ardis, RAM), GEO Satellite Circuit-Switched Services (AMSC, TMI), GEO Satellite Packet Networks (AMSC, TMI, Norcom, Qualcomm), or LEO Satellite Networks (Orbcomm, GlobalStar, Iridium, ICO) As used herein, the term "Computer" means a programmable device that responds to a specific set of instructions. A computer can be electronic or digital. The actual machinery, for example, wires, transistors, and circuits are called hardware and the instructions are called software. Most computers typically comprise: a memory that enables a computer to store, at least temporarily, data and programs; a mass storage device that allows a computer to permanently retain large amounts of data (Common mass storage devices include disk drives and tape drives); an input device, for example, a keyboard or mouse, through which data and instructions enter a computer; an output device for example a display, screen or printer or other device that lets you see what the computer has accomplished; and a central processing unit (CPU), the component that executes instructions. In addition to these components, many other components make it possible for the basic components to work together efficiently. For example, most computers have a bus that transmits data from one part of the computer to another. Some examples of typical computers are a personal computer, a workstation, a minicomputer, multi-user computer, a mainframe, or a supercomputer.

As used herein, the term "Internet" means a global network of computers.

As used herein, the term "Intranet" means a secure network belonging to an organization, for example, a corporation, accessible only by that organization's members, employees, or others with appropriate authorization, for storage and sharing of information.

As used herein, the term "Network" means a group of two or more computers linked together. There are many types of networks, including: local-area networks (LANs), where the computers are geographically close together, typically, in the same building) and wide area networks (WANs) where the computers are farther apart and are connected by telephone lines or radio waves. In addition to these types, the following characteristics are also used to categorize different types of networks: topology is the geometric arrangement of a computer system (Common topologies include a bus, a star, and a ring); the protocol defines a common set of rules and signals that computers on the network use to communicate (One of the most popular protocols for LANs is called Ethernet). Networks can be broadly classified as using either a peer-to-peer or client/server architecture. Computers on a network are sometimes called nodes. Computers and devices that allocate resources for a network are called servers.

There is an increasing demand for rapid inspection, and if necessary, repair, of large complex structures such as jet engines and turbine or generator units. Standard methods of maintaining such complex machines are very time consuming—usually involving possible removal, disassembly, detailed inspection, repair and finally re-assembly.

Recent progress in the medical field has shown the value of endoscopic proceedures that allow major surgery to be replaced with treatment via endoscopes and endoscopic tools introduced through small incisions. Such treatment is called minimally invasive surgery. "Industrial inspection or repair systems use the functional equivalent to medical endoscopy. These procedures are performed with minimal disassembly of the machine. Due to the need to reliably detect very small defects one must provide for more than just visual images to be relayed from the distal end of the probe. A multi-modal sensor approach would allow for placement at the distal tip of sensors such as eddy current, florescent penetrant and X-ray sensors in cooperation with the normal visual capability. Miniature tools at the tip (such as grinding burrs, drills, grit blasting nozzles etc) would allow the required repairs to be made without disassembly of the unit under test.

The qualifications for a human inspector are very high and it is often difficult to place such a person rapidly at a remote site. Thus, it would be desirable to be able to place a less qualified inspector onsite and to allow him to interact with a remote, co-located group of experts who have a large amount of computer processing or many reports available to them. Based on the current onsite sensor data (transmitted to the remote center) the remote group of experts could cause additional tests to be run or measurements onsite and the data returned to the remote expert center. Such a system would ideally be compact and relatively portable.

A Reduced Access Field Inspection System (RAFIS) 100 comprises a Multimodality endoscopic assembly 102, circuitry 104 coupled to multimodality endoscopic assembly 102 for generating signals 105 associated with multimodality endoscopic assembly 102, a Center Of Excellence (COE) 106 and a communications link 108 for linking circuitry 104 to COE 106, as shown in FIG. 1.

RAFIS 100 is typically utilized, as discussed in greater detail below, to inspect, evaluate or repair a representative machine or complex assembly 110.

Multimodality endoscopic assembly 102 comprises a plurality of modules 112, which modules 112 comprise sensors or tools for precision controlled inspection, repair or other maintenance process. Multimodality endoscopic assembly 102 is configurable by a system-user to facilitate access to internal portions of complex assembly 110.

Typically, multimodality endoscopic assembly 102 comprises an elongated shaft 114, an actuating mechanism 116 disposed at a proximal end 118 of shaft 114 and a device support member 120 pivotally mounted to a distal end 122 of shaft 114. In one embodiment, modules 112 are interchangeably attachable to device support member 120.

Shaft 114 can be a rigid or a malleable member and provides a coupling between actuating mechanism 116 and device support member 120 to effect rotation of device support member 120, typically through a flexible operating cable or filament.

Actuating device 116 typically functions as a handle for manually grasping multimodality endoscopic assembly 102.

Modules 112 include but are not limited to a visual inspection module, an ultrasound module, a vacuum module, a cleaning module, a grinding module, an Eddy-current module, an x-ray module, a measurement module, a laser ultrasound module, a scissors module, a cutting module, a solid-state laser module, a magnetic sensor module, an infra-red module, a grasper module, a stapler module, a nitrogen purge module, or the like. In one embodiment, distal end 122 contains a CCD imager chip to relay an image from the vicinity of distal end 122 to a user at proximal end 118. In another embodiment, there are multiple tubular internal passages (not shown) used to deliver fluids, gases and mechanical devices to distal end 122 or to convey wires or optical fibers from distal end 122 to proximal end 118.

As discussed above, multimodality endoscopic assembly 102 is coupled to circuitry 104 for generating and receiving signals 105 associated with multimodality endoscopic assembly 102.

In one embodiment, circuitry 104 is a microprocessor or computer coupled to multimodality endoscopic assembly 102 for generating, receiving or processing signals from a respective module 112.

COE 106 is a remote support function. COE 106 typically comprises at least one of technical experts, a data processing center, or at least one global database.

Experts at the COE can be reached remotely in person, by phone, computer link or across an Intranet, network or Internet. These experts typically have multiple databases available to them to relate to specific parts or issues. These databases may include information about design data, tolerances, as well as field data from previous inspection and defect statistics. These databases are continually updated to improve the inspection analysis. Data may exist in many forms, including, for example, measurements, statistics, CAD data, photos or other illustrative drawings or images.

RAFIS 100 enables disassembly only to the point where an operator can efficiently place modules 112 deep within complex assembly 110, for example an aircraft engine. Flaw detection and analysis software can be used to facilitate decisions and can be linked online to COE 106. COE 106 would facilitate specialized data processing and provide access to global databases as well as to experts for advice and interpretation of inspection results.

An expert at COE 106 may receive an eddy current image containing an indication acquired from inspection of a part, e.g., a turbine disk, and a request for analysis to determine whether the part can be safely used in service. The expert would then use information available to him in the databases as well as the expert's own personal inspection expertise to evaluate the part. This evaluation may include analysis such as fracture mechanics analysis. This type of analysis allows reliable inspections at remote sites, even though skilled inspectors may not be present.

Figure 2:
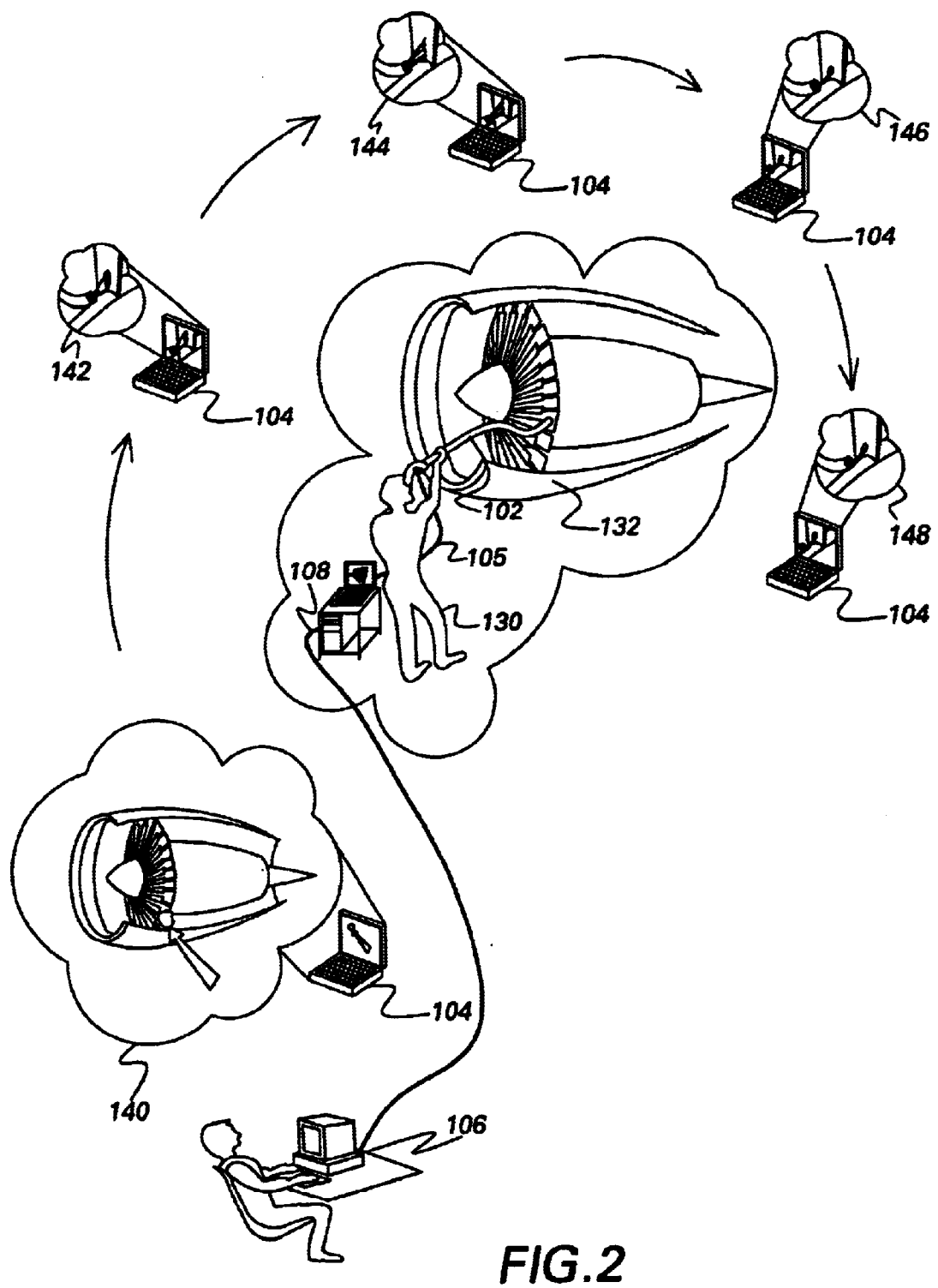
FIG. 2 is a schematic depiction of another aspect of the instant invention.

As shown in FIG. 2, an inspector 130 manipulates multimodality endoscopic assembly 102 to inspect internal portions of an aircraft engine 132.

In one embodiment, circuitry 104, for example a computer, displays a picture of the internal portions of aircraft engine 132 using a visual inspection module 112. By viewing the internal portions inspector 130 can navigate (140) multimodality endoscopic assembly 100 to an internal point in need of inspection or repair. Once endoscopic assembly 102 is positioned adjacent to the inspection point, visual inspection module 112 is used to view and inspect the inspection point (142). COE 106 receives the image of the inspection point via communications link 108. COE 106 instructs inspector 130 to clean the inspection point (144) using a cleaning module 112. Next, COE 106 instructs inspector 130 to utilize an ultrasound module 112 to determine the severity of the inspection point (146). Based on the feedback from the various inspection modules 112, COE 106 instructs inspector 130 to grind the inspection point using a grinding module 112 (148). This embodiment is an exemplary embodiment of RAFIS 100 and not a limitation. In fact, RAFIS 100 can be utilized in a variety of fashions using a variety of modules 112.

Figure 3:
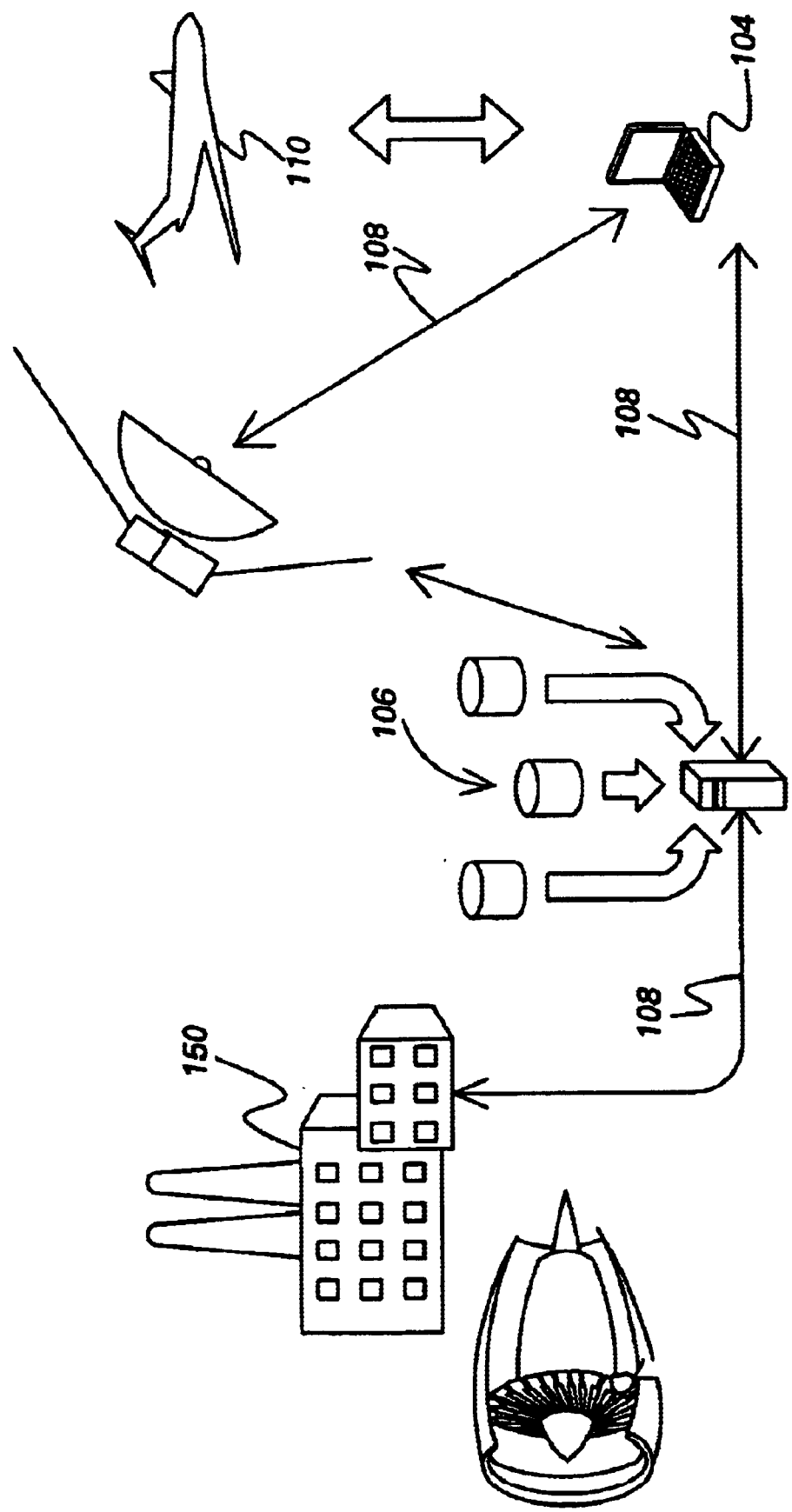
FIG. 3 is a schematic depiction of another aspect of the instant invention.

FIG. 3 shows a feedback loop for the valuable information generated at a variety of locations. Information generated by inspection or repair of a complex assembly 110 is received and reviewed by an onsite inspector 130 (FIG. 2) on computer 104 (FIG. 3). The inspection information is sent via communications link 108 and is received and reviewed by COE 106 for real-time correspondence and interaction with inspector 130 (FIG. 2). Additionally, the information is incorporated into the databases of COE 106 (FIG. 3) for future reference. Additionally, the information can optionally be sent to a manufacturing location 150 of the inspected complex assembly 110. The information can be utilized by manufacturing location 150 for a variety of purposes, for example, to give designers and manufacturers critical information that can create more reliable equipment at lower costs.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A reduced access field inspection system for inspecting a complex apparatus, said system comprising:
   a multimodality endoscopic assembly comprising a shaft, an actuating mechanism mounted to a proximal end of said shaft, a device support member pivotally mounted to a distal end of said shaft, and a flexible cable positioned within said shaft and coupled to said device support member and said actuating mechanism, said actuating mechanism configured to rotate said device support member using said flexible cable;
   circuitry coupled to said multimodality endoscopic assembly for generating signals associated with said multimodality endoscopic assembly;
   a remote center of excellence including a plurality of global databases; and
   a communications link for linking said circuitry to said remote center of excellence.

2. A remote access field inspection system in accordance with claim 1, wherein said multimodality endoscopic assembly includes modules selected from the group consisting of a visual inspection module, an ultrasound module, a vacuum module, a cleaning module, a grinding module, an Eddy-current module, an x-ray module, a measurement module, a laser ultrasound module, a scissors module, a cutting module, a solid-state laser module, a magnetic sensor module, an infra-red module, a grasper module, a stapler module, and a nitrogen purge module.

3. A reduced access field inspection system in accordance with claim 1, wherein said circuitry comprises a microprocessor.

4. A reduced access field inspection system in accordance with claim 1, wherein said circuitry comprises a computer.

5. A reduced access field inspection system in accordance with claim 1, wherein said remote center of excellence includes a data-processing center.

6. A reduced access field inspection system in accordance with claim 1, wherein the center of excellence includes technical experts.

7. A reduced access field inspection system in accordance with claim 1, wherein said communications link includes a wireless communication link.

8. An inspection system for inspecting a complex apparatus, said inspection system comprising:
   a multimodality endoscopic assembly comprising a shaft, an actuating mechanism mounted to a proximal end of said shaft, a device support member pivotally mounted to a distal end of said shaft, and a flexible cable positioned within said shaft and coupled to said device support member and said actuating mechanism, said actuating mechanism configured to rotate said device support member using said flexible cable;
   circuitry coupled to said multimodality endoscopic assembly for generating signals associated with said multimodality endoscopic assembly;
   a remote center of excellence including a plurality of global databases; and
   a communications link for linking said circuitry to said remote center of excellence.

9. An inspection system in accordance with claim 8 wherein said device support member is configured for interchangeably attaching at least one module.

10. An inspection system in accordance with claim 9, wherein, said multimodality endoscopic assembly includes modules selected from the group consisting of a visual inspection module, an ultrasound module, a vacuum module, a cleaning module, a grinding module, an Eddy-current module, an x-ray module, a measurement module, a laser ultrasound module, a scissors module, a cutting module, a solid-state laser module, a magnetic sensor module, an infra-red module, a grasper module, a stapler module, and a nitrogen purge module.

11. An inspection system in accordance with claim 8, wherein said circuitry comprises a microprocessor.

12. An inspection system in accordance with claim 8, wherein said circuitry comprises a computer.

13. An inspection system in accordance with claim 8, wherein said remote center of excellence includes a data-processing center.

14. An inspection system in accordance with claim 8, wherein the center of excellence includes technical experts.

15. An inspection system in accordance with claim 8, wherein said communications link includes a wireless communications link.

16. A method of inspection comprising:
   inspecting an internal portion of a mechanical apparatus using a multimodality endoscopic assembly including a shaft, an actuating mechanism mounted to a proximal end of said shaft, a device support member pivotally mounted to a distal end of said shaft, and a flexible cable positioned within said shaft and coupled to said device support member and said actuating member, said actuating mechanism configured to rotate said device support member using said flexible cable;
   generating signals associated with said inspection;
   sharing said signals with a remote center of excellence including a plurality of global databases; and
   interacting with said remote center of excellence to improve said inspecting of said internal portion of said complex apparatus.

* * * * *